Sept. 25, 1962   J. H. ANDRESEN, JR   3,055,256
MASK FOR DIVERS WITH IMPERFECT VISION
Filed June 4, 1956

INVENTOR.
JOHN H. ANDRESEN, JR.

BY Ostrolenk, Faber,
Gerb & Soffen
ATTORNEYS

United States Patent Office 3,055,256
Patented Sept. 25, 1962

3,055,256
MASK FOR DIVERS WITH IMPERFECT VISION
John H. Andresen, Jr., Forest Knolls,
Greenwood Lake, N.Y.
Filed June 4, 1956, Ser. No. 589,121
3 Claims. (Cl. 88—1)

My present invention relates to diving masks and more particularly to a mask which is specifically adapted to use by divers with imperfect vision.

Flat-faced diving masks have been used for a substantial period of time by persons engaged in the sport known as skin diving.

The primary function of the mask is to provide a smooth or plane interface between the air surrounding the diver's eyes and nose and the water in which the diver operates so that the diver may have good vision under water.

Divers with imperfect vision have attempted to wear ordinary spectacle frames or spectacle frames specially designed for use within a diving mask in order to maintain appropriate vision while engaged in the sport.

However, the wearing of such spectacles multiplied any difficulties which existed such as: (1) Fogging of both the mask and the glasses had to be coped with. (2) Droplets of water on the glasses often interfered with vision. (3) Frames were uncomfortable on the nose. (4) Field of view was quite limited.

The primary object of my invention is the formation of the transparent face of the skin diving mask to form a lens which will have a minus diopter index for near-sighted persons when the convex side is toward the water and which, with the concave side toward the water, may be used by far-sighted persons.

Most of the problems of vision correction which arise in connection with skin diving are corrections for near-sightedness or far-sightedness. Hence, two such lenses, one a 1 diopter lens and the other a 2 diopter lens (i.e. 7"–14" radius of curvature), used in either of the above ways will meet the problem of virtually everyone.

The lens material must be thin and of nearly constant thickness, and the corrective effect is caused by the difference in index of refraction of the air inside the lens and water outside. Otherwise, this might be misconstrued as an oversize monocle.

The foregoing and many other objects of my invention will become apparent in the following description and drawings in which.

Figure 1:
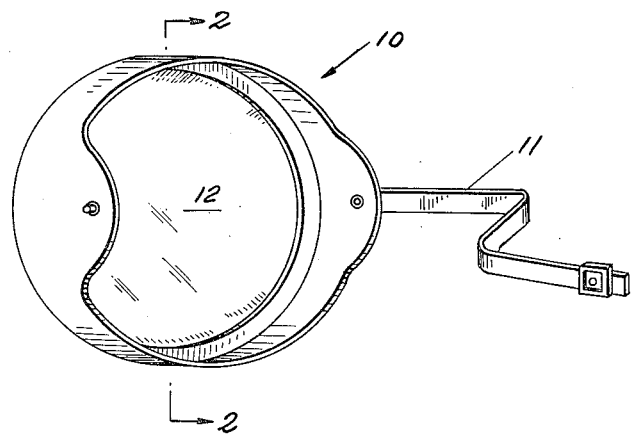
FIGURE 1 is a view in perspective of my novel skin diving mask.
Figure 2:
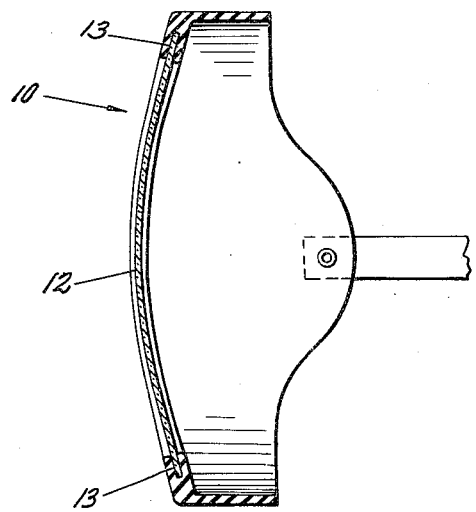
FIGURE 2 is a cross-sectional view taken from line 2—2 of FIGURE 1.

Referring now to FIGURES 1 and 2, my novel skin diving mask comprises a frame 10 so arranged that it will form an air-tight seal against the face of the user and appropriate means 11 for securing the mask to the face of the user.

A lens 12 which may be of any appropriate transparent material such as glass or a transparent plastic such as "Lucite" or "Plexiglas" is supported in appropriate recesses 13 in the mask 10. The mask 10, the mask securing means 11 and the recesses 13 therein for supporting the lens may be of any conventional arrangement.

My invention is directed to the fact that the lens incorporates a full vision correction for normally near-sighted persons and for this purpose, the lens may be made removable and replaceable or made with a specific correction for the particular user.

As above noted, two lenses of 1 and 2 diopters, respectively, should take care of most vision problems. For far-sighted correction, lens 12 will be reversed in the mask to provide appropriate correction.

My novel lens has the following important features: (1) It is as easy to defog as a conventional mask. (2) It is as comfortable as a conventional mask. (3) For a near-sighted correction, the field of view is actually increased over a mask with the same size flat lens. (4) For a near-sighted correction, the size and distance of objects under water is reduced. For a minus 2 diopters this correction brings the apparent size approximately to normal. Bottles, golf balls and even fish look their true size. The usual effect of objects looking larger than they really are (in the case of flat lenses) is compensated for by the position relative to the eyes and curvature of the lens. This, of course, accounts also for the wider field mentioned above. (5) The corrective lenses should cost little more than flat lenses after initial tooling is amortized. (6) For a given thickness, the spherical plate can withstand more pressure.

In the foregoing the invention has been described solely in connection with specific illustrative embodiments thereof. Since many variations and modifications of the invention will now become obvious to those skilled in the art, I prefer to be bound not by the specific disclosures herein contained but only by the appended claims.

I claim:

1. A diving mask; said diving mask comprising a frame, flexible means for securing said frame to face portions of a wearer and forming a water tight seal between the portions of the face of the wearer and said frame; a single transparent face plate secured to said frame in a water tight manner; said single transparent face plate having a diameter large enough to extend across the both eyes of the wearer and being held in fixed spaced relation from the both eyes of the wearer, regardless of head motions of the wearer; said face plate being spherically curved and having a substantially uniform thickness; said face plate providing a water to air boundary when worn immersed in water to provide a vision correction curve over its entire surface; said spherically curved face plate having a radius of curvature in the range of 7–14 inches.

2. The device of claim 1 wherein said spherically curved face plate has a convex surface facing outward.

3. The device of claim 1 wherein said optically curved face plate has a convex surface facing inward.

References Cited in the file of this patent

UNITED STATES PATENTS

| | | |
|---|---|---|
| 1,369,669 | Kamenos | Feb. 22, 1921 |
| 1,724,870 | Belt | Aug. 13, 1929 |
| 1,742,412 | O'Flanagan | Jan. 7, 1930 |
| 2,008,530 | Wick | July 16, 1935 |
| 2,088,262 | Grano | July 27, 1937 |
| 2,617,100 | Moeller | Nov. 11, 1952 |
| 2,730,014 | Ivanoff et al. | Jan. 10, 1956 |
| 2,799,020 | Currie | July 16, 1957 |

FOREIGN PATENTS

| | | |
|---|---|---|
| 1,040,064 | France | May 20, 1953 |